US009268747B2

(12) United States Patent
Enoki et al.

(10) Patent No.: US 9,268,747 B2
(45) Date of Patent: Feb. 23, 2016

(54) METHOD FOR DETECTING NEGATIVE OPINIONS IN SOCIAL MEDIA, COMPUTER PROGRAM PRODUCT AND COMPUTER (71) Applicant: International Business Machines Corporation, Armonk, NY (US)

(72) Inventors: Miki Enoki, Kanagawa-ken (JP); Hiroshi Kanayama, Kanagawa-ken (JP); Tetsuya Nasukawa, Kanagawa-ken (JP); Shiho Negishi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 13/792,307

(22) Filed: Mar. 11, 2013

(65) Prior Publication Data
US 2013/0238318 A1    Sep. 12, 2013

(30) Foreign Application Priority Data

Mar. 12, 2012  (JP) ................................ 2012-054711

(51) Int. Cl.
*G06F 17/27* (2006.01)
*G06F 17/21* (2006.01)
G06F 17/30 (2006.01)
G06Q 30/02 (2012.01)

(52) U.S. Cl.
CPC .............. *G06F 17/21* (2013.01); *G06F 17/277* (2013.01); *G06Q 30/0201* (2013.01); *G06F 17/2715* (2013.01); *G06F 17/2785* (2013.01); *G06F 17/30728* (2013.01); *G06Q 30/02* (2013.01)

(58) Field of Classification Search
CPC combination set(s) only.
See application file for complete search history.

(56) References Cited

U.S. PATENT DOCUMENTS

| 2002/0099775 | A1* | 7/2002 | Gupta et al. ................... 709/205 |
|---|---|---|---|
| 2005/0091038 | A1* | 4/2005 | Yi et al. ........................... 704/10 |
| 2006/0173819 | A1* | 8/2006 | Watson .............................. 707/3 |
| 2006/0265368 | A1* | 11/2006 | Nickerson et al. ................. 707/5 |
| 2008/0270116 | A1* | 10/2008 | Godbole et al. .................... 704/9 |
| 2009/0048823 | A1* | 2/2009 | Liu et al. ............................ 704/9 |
| 2011/0077988 | A1* | 3/2011 | Cates et al. .................. 705/7.32 |
| 2011/0099052 | A1* | 4/2011 | Brun et al. .................... 705/7.38 |
| 2011/0295594 | A1* | 12/2011 | Cai et al. ............................ 704/9 |
| 2012/0221357 | A1* | 8/2012 | Krause et al. ...................... 705/4 |
| 2012/0245923 | A1* | 9/2012 | Brun .................................. 704/9 |
| 2012/0290551 | A9* | 11/2012 | Ghosh ........................... 707/706 |

FOREIGN PATENT DOCUMENTS

| JP | 11-203298 A | 7/1999 |
|---|---|---|
| JP | 2002-183033 A | 6/2002 |
| JP | 2003-114907 A | 4/2003 |

(Continued)

Primary Examiner — Richard Zhu
(74) Attorney, Agent, or Firm — Fleit Gibbons Gutman Bongini & Bianco PL; Jon A. Gibbons (57) ABSTRACT A method, device, and computer program product for detecting negative opinions in social media, computer program product, and computer. Negative opinions in social media can be precisely detected at an early stage. A method for processing, with a computer, a plurality of messages sent by a plurality of users over time includes the following steps: obtaining a plurality of messages, each including a specific proper noun; determining a politeness level of each of the plurality of messages, each including the specific proper noun; and calculating a proportion of messages having a politeness level lower than a certain threshold with respect to the plurality of messages, each including the specific proper noun.

21 Claims, 10 Drawing Sheets

(56) References Cited

FOREIGN PATENT DOCUMENTS

| | | |
|---|---|---|
| JP | 2006-004098 A | 1/2006 |
| JP | 2008-210392 A | 9/2008 |
| JP | 4561849 B2 | 10/2010 |
| WO | WO2008-075524 | 6/2008 |

* cited by examiner

LIST OF SPECIFIC WORDS

| SPECIFIC WORD | SCORE |
|---|---|
|  |  |
| XXX | Si |
|  |  |
| YYY | Sj |
|  |  |

$L = \alpha \times \beta \times S$

METHOD FOR DETECTING NEGATIVE OPINIONS IN SOCIAL MEDIA, COMPUTER PROGRAM PRODUCT AND COMPUTER

CROSS-REFERENCE TO RELATED APPLICATION

This application claims priority under 35 U.S.C. §119 from Japanese Patent Application No. 2012-054711, filed Mar. 12, 2012, the entire contents of which are incorporated herein by reference.

BACKGROUND OF THE INVENTION

The present invention relates to the field of information processing technology. More specifically, to a technology that more precisely detects negative opinions in social media regarding an organization, a product, a service, or an individual.

Since an enormous number of messages are exchanged in social media, a situation can arise in which criticism about a certain topic is spread in a short period of time, causing a flood of messages expressing negative opinions. When the target of such negative opinions is a company or its products, it is highly likely that such negative opinions will seriously damage the company's image and business. Accordingly, there is a business demand for grasping the emergence of negative opinions in social media at an early stage. In response to such a demand, various technical methods have been suggested in the related art.

An increase in the number of messages about a certain topic tends to occur in accordance with the novelty or impact of the topic. Examples of such an increase include a sharp increase in the number of messages about a new product when the release date is announced, when the product is released, or when an event related to the product is held; a sharp increase in the number of messages about public transportation after a disaster occurs; and a sharp increase in the number of messages about a certain news item. As a result of this sharp increase, it is difficult to grasp circulating information related to negative opinions by only monitoring an increasing trend in the number of messages about a certain topic.

Also, negative opinions are expressed in a great variety of ways and it is difficult to precisely detect all the negative opinions on the basis of a specific expression that is predefined (e.g., a keyword related to an offensive or inappropriate word). An example of this is as follows. After the Great East Japan Earthquake, planned blackouts in specific regions were scheduled due to an electric power shortage caused by suspended operations of nuclear power plants. In social media the fact that "only specific commercial facilities in a region of planned blackouts are not to be targets of planned blackouts" was criticized as being unfair. However, "not being a target of planned blackouts" is generally not criticized and is difficult to detect even by using an opinion analysis method (a technique of recognizing positive or negative opinions) which has been studied in recent years.

The present invention has been made in view of the above-mentioned problems. Improvements to related art are still desired to provide a more precise means for detecting a situation where something is criticized in social media (e.g., messages expressing negative opinions circulating in microblogs) and for grasping the details of the criticism.

SUMMARY OF THE INVENTION

Accordingly, one aspect of the present invention is a computer implemented method for processing a plurality of messages sent by a plurality of users over time, wherein the computer includes a processor communicatively coupled to a memory, the method including steps of: obtaining the plurality of messages each including a specific proper noun; determining a politeness level of each of the plurality of messages each including the specific proper noun; and calculating a proportion of messages having a politeness level lower than a certain threshold with respect to the plurality of messages each including the specific proper noun.

Another aspect of the present invention is a computer system for processing a plurality of messages sent by a plurality of users over time, including: means for obtaining a plurality of messages each including a specific proper noun; means for determining a politeness level of each of the plurality of messages each including the specific proper noun; and means for calculating a proportion of messages having a politeness level lower than a certain threshold with respect to the plurality of messages each including the specific proper noun.

Another aspect of the present invention is a computer readable storage medium tangibly embodying a computer readable non-transitory program code having computer readable instructions which, when implemented, cause a computer to carry out the steps of the method for processing a plurality of messages sent by a plurality of users over time, the method of steps including: obtaining the plurality of messages each including a specific proper noun; determining a politeness level of each of the plurality of messages each including the specific proper noun; and calculating a proportion of messages having a politeness level lower than a certain threshold with respect to the plurality of messages each including the specific proper noun.

BRIEF DESCRIPTION OF THE DRAWINGS

FIGS. 4(a)-4(c) show explanatory diagrams of data structures of data stored in hard disk devices in a microblog server.

DETAILED DESCRIPTION OF THE PREFERRED EMBODIMENTS

The inventors have intensively studied the above-described problems and have made the following findings. Compared to text written with consideration of readers, such as a newspaper article or essay, the style of messages circulating in social media varies in terms of politeness or impoliteness (offensiveness). Furthermore, the following features can be found regarding the politeness or impoliteness (offensiveness). Firstly, text written in an impolite (offensive) style is more likely to have malicious or aggressive content and is more likely to include negative opinions. Secondly, the style varies depending on writers and some writers tend to create text in an impolite style often. Thirdly, when a writer cites someone's message, his/her feeling regarding the message and impact of the message are likely to become stronger as the length of the comment regarding the message increases. Fourthly, text written in a polite style tends to have explanatory content with the purpose of informing someone about something.

On the basis of these insights into the nature of messages circulating in social media, the inventors have made the following invention to grasp circulating information related to negative opinions, which cannot be grasped using a method according to the related art.

According to the present invention, negative opinions in social media can be precisely detected at an early stage. The present invention provides a method for processing, with a computer, a plurality of messages sent by a plurality of users over time, the method including the following steps: obtaining a plurality of messages, each including a specific proper noun; determining a politeness level of each of the plurality of messages, each including the specific proper noun; and calculating a proportion of messages having a politeness level lower than a certain threshold with respect to the plurality of messages, each including the specific proper noun.

The specific proper noun is any name of a specific organization, specific product, specific service, and/or a specific person. An appropriate proper noun can be selected as a target to be monitored.

The step of determining a politeness level can determine the politeness level on the basis of whether or not the message includes a specific word representative of a politeness level. More specifically, the specific word can be an ancillary word including "yagaru" or "chimau" (auxiliary verb for expressing something in an impolite manner in Japanese language), a conjugational form of the ancillary word, or an independent word including "yatsura" or "omae" ("yatsura" is a way of saying "they" and "omae" is a way of saying "you" in an impolite manner in Japanese language). The step of determining a politeness level can determine that the politeness level is low when the message includes the specific word. Other examples of the word whose politeness level is determined to be low include "janeeno," "kuseni," "yabee," "furubokko," "kayo," "sunna," "tenna," "ndayo," "teyaru," "yona," "yatsura," "darouga," "yamero," "kayo," "nokane," "kuso," "daro!," "me (noun)," "koitsu," "(shi)tee," "sunna(yo)," "atama-okashii," "temee," "omae," "fuzakeruna," "tenna," "neeyo," "kuzu," "kisama," "baka-nano?," "atama-warui," "jan(ka)yo," "uzee," "janeeno," "arienai," "mitaina," "sugi," etc. (these are auxiliary verbs, personal pronouns, adjectives, and so forth for expressing something in an impolite manner in Japanese language).

On the other hand, the step of determining a politeness level can determine that the politeness level is high when the message includes the following specific word types. The specific word can be an ancillary word including "desu" or "masu" (auxiliary verb for expressing something in a polite manner in Japanese language), a conjugational form of the ancillary word, or an independent word including "oki" (a polite expression placed at the start of a sentence in Japanese language).

According to one method used in social media, a user cites a message sent by someone else, adds his/her comment to the message, and sends a new message. When the message includes a citation portion cited from another message sent by another user and a comment portion including a comment given regarding the citation portion, the step of determining a politeness level can determine the politeness level on the basis of the comment portion. Furthermore, when the number of characters in the comment portion is large compared to when the number of characters in the comment portion is small, the step of determining a politeness level can determine that the politeness level is higher when determining the politeness level to be high and can determine that the politeness level is lower when determining the politeness level to be low.

The step of determining a politeness level can determine the politeness level in view of a trend of politeness of messages of the individual users. In other words, the step of determining a politeness level can determine a politeness level of one message on the basis of politeness levels of other messages sent by a user who has sent the one message. That is, the step of determining a politeness level can determine the politeness level of the one message on the basis of a difference between the politeness level of the one message and the politeness levels of the other messages.

Also, the method can further include a step of recording temporal change in the proportion of the messages having a politeness level lower than a certain threshold and a step of outputting a certain alarm when a value of the temporal change exceeds a certain threshold. Also, when the proportion exceeds a certain threshold, messages having a politeness level lower than a certain lower-limit threshold can be output. The output messages can be selected in ascending order of the politeness level. Furthermore, the specific word in the output messages can be highlighted. On the other hand, when the proportion exceeds the certain threshold, messages having a politeness level higher than a certain upper-limit threshold can be output. The step of obtaining can receive and obtain, from a social media server, a plurality of messages sampled under a condition of including the specific proper noun, among messages sent to the social media server in a certain period.

Hereinafter, the best mode for carrying out the present invention will be described in detail with reference to the drawings. The following embodiment does not limit the invention according to the claims and not all the combinations of features described in the embodiment are essential to solve the above-described problems. The present invention can be carried out in accordance with many different embodiments and should not be interpreted as being limited to the description of the embodiment. The present invention can be embodied as a computer program product or a computer system and technical features that are substantially the same as those described in the embodiment of the present invention can be provided. Throughout the description of the embodiment, the same elements are denoted by the same reference numerals unless otherwise specified.

Figure 1:
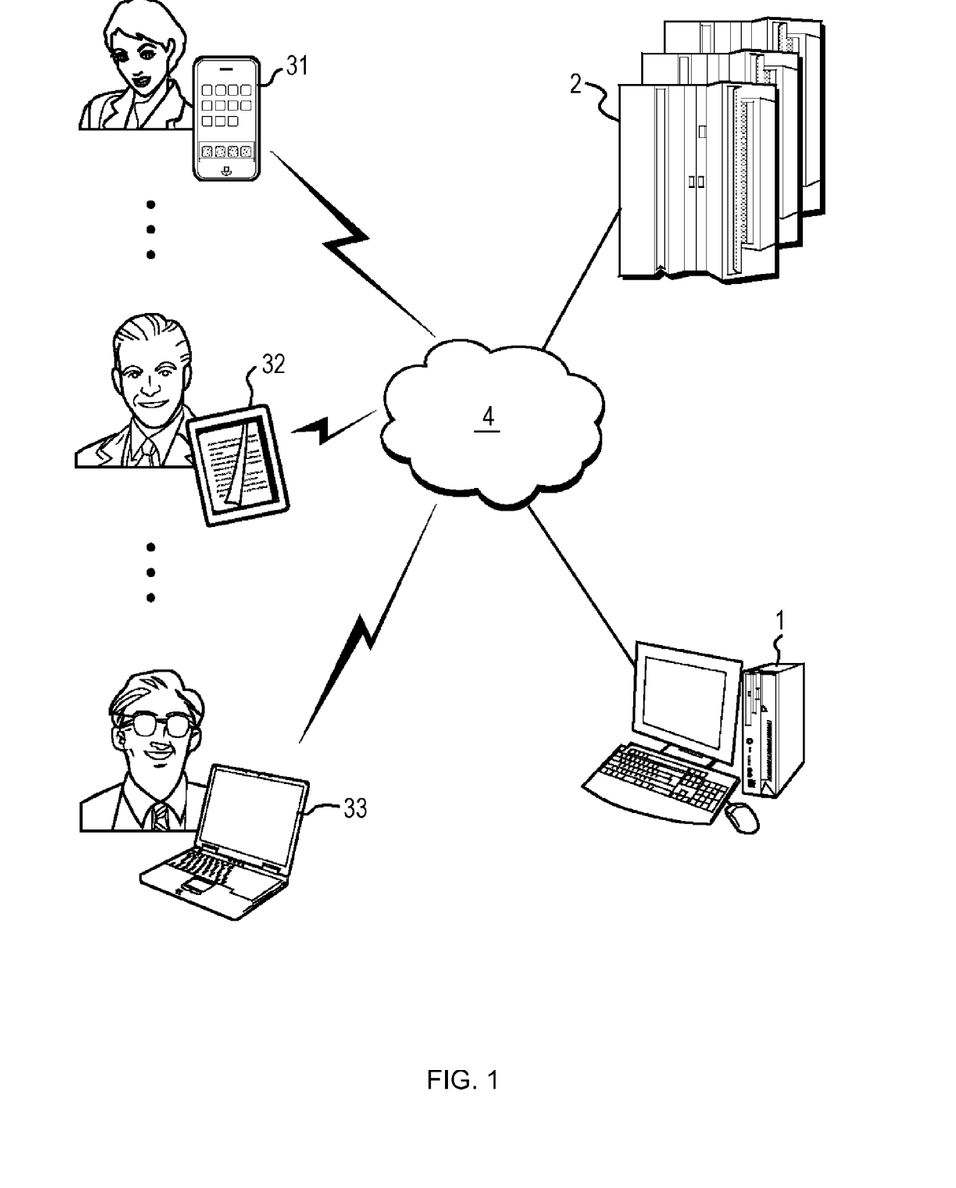
FIG. 1 is a conceptual diagram describing a microblog system.

FIG. 1 is a conceptual diagram describing a microblog system, which is an example of social media. This system includes a microblog server 2 and user terminals, which are connected so that they can communicate with one another via the internet 4. Computers of various forms having a communication function can be employed as the user terminals. For example, a smart phone 31, a tablet 32, a desktop computer 1, and a notebook (personal computer) 33 illustrated in FIG. 1 can be employed. Alternatively, a personal data assistant (PDA, a mobile information terminal), a vehicle-mounted computer, a netbook, and the like can be employed (not illustrated).

Figure 2:
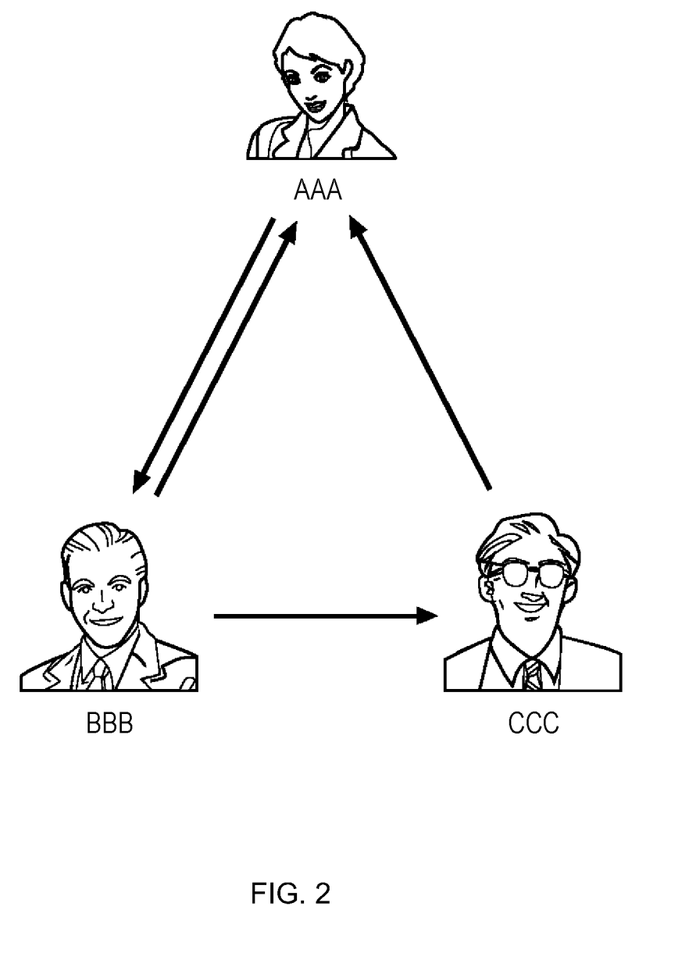
FIG. 2 is a conceptual diagram describing a following-followed relationship of a microblog.

FIG. 2 is a conceptual diagram describing a following-followed relationship of a microblog. A user of a microblog can register, in advance, his/her friends, acquaintances, and other users having common interest and can automatically receive messages sent by them. Such registration is called "follow." Relationships regarding "follow" include a relationship in which users mutually follow and a relationship in which one user unilaterally follows another user. For example, the arrows in FIG. 2 indicate that user AAA and user BBB follow each other, user BBB unilaterally follows user CCC, and user CCC unilaterally follows user AAA.

Figure 3:
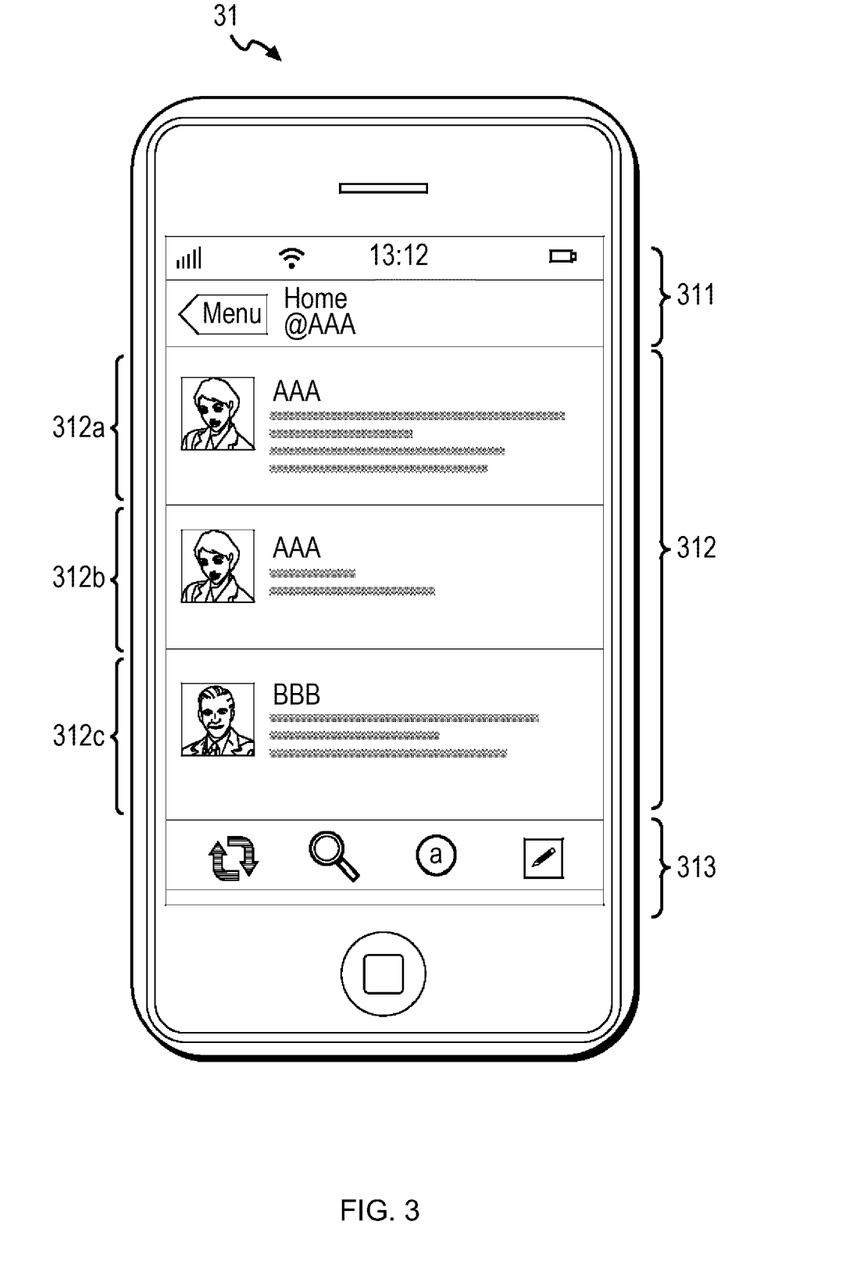
FIG. 3 is an explanatory diagram of a smart phone serving as a user terminal and screen display.

FIG. 3 describes the smart phone 31 serving as a user terminal and the screen display thereof. A microblog application screen is displayed on the touch screen of the smart phone 31. The application screen includes, from the top, a home section 311, a timeline section 312, and an operation section 313. In the home section 311, a menu button and a sign indicating that the timeline section 312 is the timeline of user AAA are displayed. In the timeline section 312, message sections 312a and 312b of user AAA and a message section 312c of user BBB are displayed from the top. These message sections 312a to 312c are displayed along time series. That is, the message section 312a at the top corresponds to the latest message.

Figure 4:
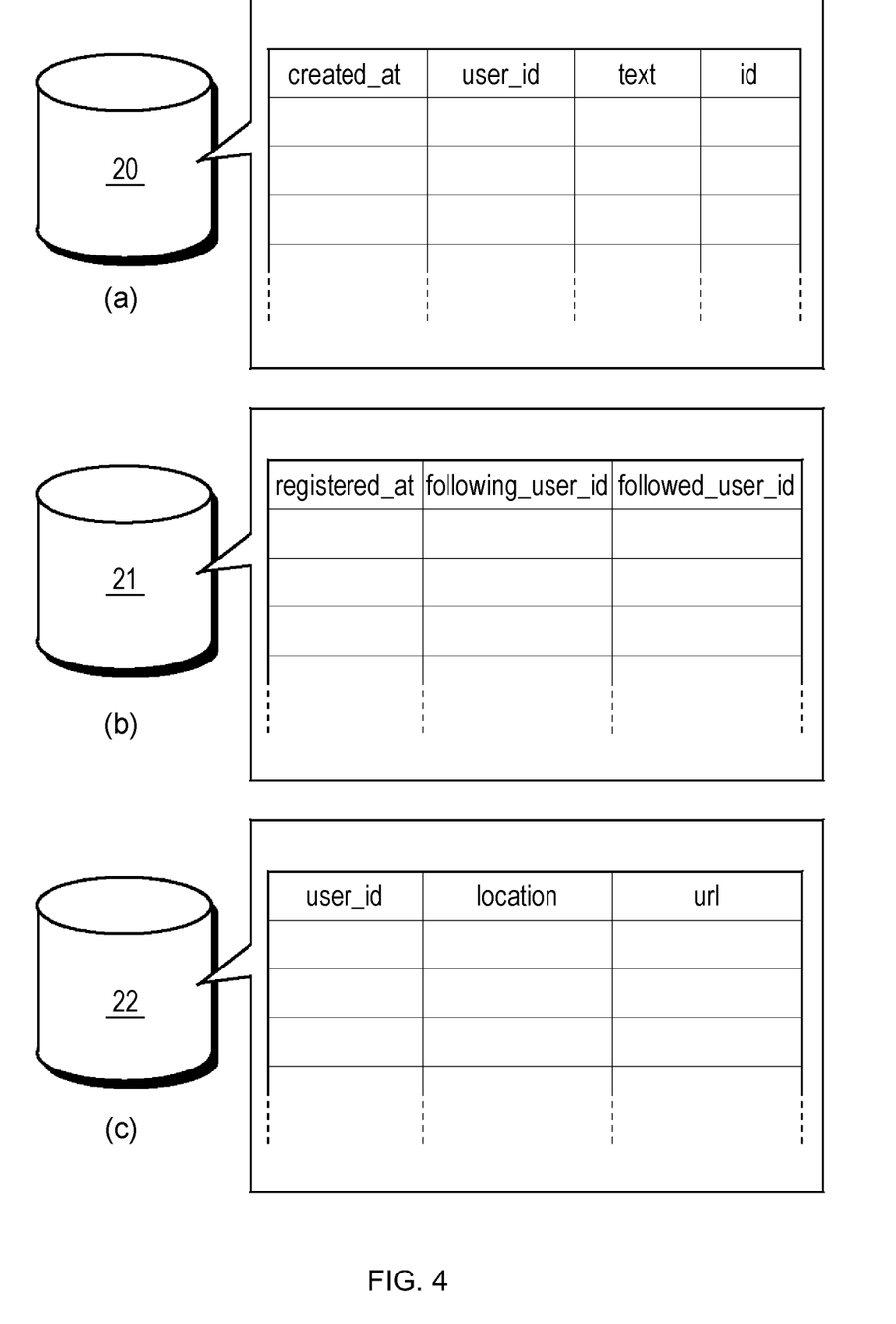
FIG. 4(a) is a diagram of a message table.
FIG. 4(b) is a diagram of a user relationship table.
FIG. 4(c) is a diagram of a profile table.

FIG. 4 describes the structures of data stored in hard disk devices 20, 21, and 22 in the microblog server 2. A message table stored in the hard disk device 20 [FIG. 4(a)] includes dates and times of sending representing the dates and times when individual messages were sent (created_at), message IDs identifying the individual messages (id), user IDs identifying users who sent the messages (user_id), and text which is the content of the messages (text). Restriction of the number of characters can be set for text (e.g., 140 characters or less). A user relationship table stored in the hard disk device 21 [FIG. 4(b)] includes dates and times of registration representing the dates and times when follow relationships were registered (registered_at), following user IDs identifying following users (following_user_id), and followed user IDs identifying followed users (followed_user_id). A profile table stored in the hard disk device 22 [FIG. 4(c)] includes user IDs identifying individual users (user_id), names of the individual users (not illustrated), location information indicating locations (location), and URL information (url) indicating addresses of related web pages.

Figure 5:
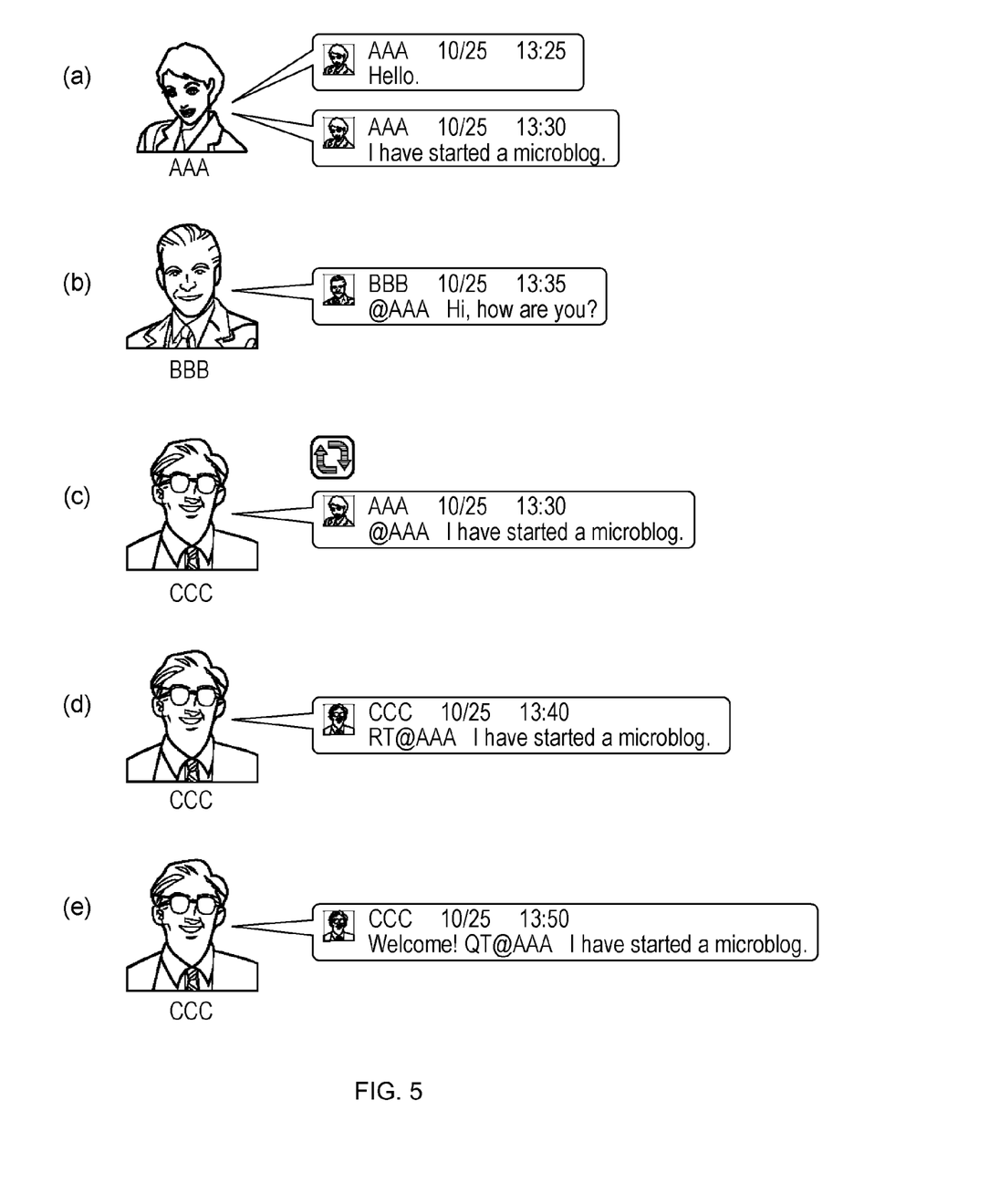
FIGS. 5(a)-5(e) show explanatory diagrams of the types of messages that are sent.

FIG. 5 describes the types of messages that are sent. FIG. 5(a) describes normal messages. Here, user AAA sends messages to her timeline and the messages are displayed on the timelines of user AAA and users who follow user AAA (in the example in FIG. 2, user BBB and user CCC). FIG. 5(b) describes a reply message. A reply message is a reply to a specific message and is displayed on the timelines of a sender of the reply message and a user who follows both the sender and a user at the destination of the reply message. Here, user BBB sends a reply message "Hi, how are you?" in response to the message sent by user AAA. This reply message is displayed on the timelines of user BBB and a user who follows user BBB (in the example in FIG. 2, user AAA).

Both FIG. 5(c) and FIG. 5(d) describe a reproduced message and illustrate a state where user CCC sends, as a reproduced message, an original message "I have started a microblog" of user AAA displayed on the timeline of user CCC. In any case, the reproduced message is displayed on the timeline of a user who follows user CCC (in the example in FIG. 2, user BBB). In a first mode illustrated in FIG. 5(c), the message is displayed with the name of user AAA on the timeline of a user who follows user CCC. In a second mode illustrated in FIG. 5(d), the message is displayed with the name of user CCC who transfers the message. FIG. 5(e) describes a cited message and illustrates a state where user CCC cites the original message "I have started a microblog" of user AAA displayed on the timeline of user CCC, inputs his comment "Welcome!," and sends the message as a cited message. This cited message is displayed on the timeline of a user who follows user CCC.

Figure 6:
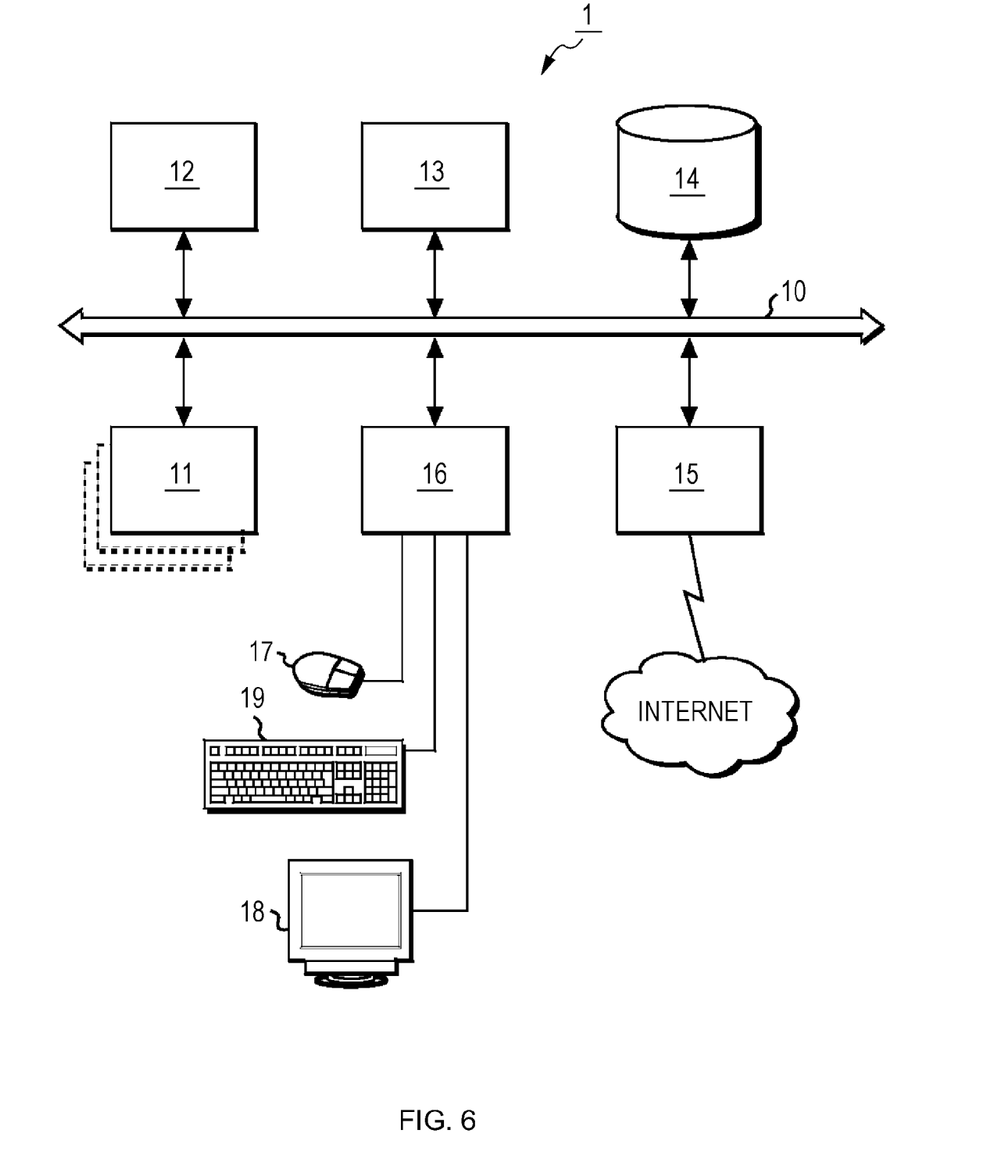
FIG. 6 is a block diagram describing a hardware configuration of a personal computer.

FIG. 6 is a block diagram describing a hardware configuration of a personal computer (PC) 1. The hardware configuration of the PC 1 includes a low-speed or high-speed bus 10, a central processing unit (CPU) 11 serving as an operation control device, a random access memory (RAM) 12 serving as a storage device, a read only memory (ROM) 13 serving as a storage device, a hard disk drive (HDD) 14 serving as a storage device, a communication interface 15, and an input/output interface 16. Furthermore, the hardware configuration of the PC 1 includes a mouse 17, a flat panel display 18 serving as a display device, and a keyboard 19, which are connected to the input/output interface 16. The PC 1 is described as a PC employing a typical personal computer architecture. Alternatively, for example, the PC 1 can include multiple CPUs 11 and multiple HDDs 14 for realizing higher data processing ability and availability. Also, various types of computer systems, including a desktop, can be employed.

The software configuration of the PC 1 includes an operating system (OS) that provides basic functions, application software that utilizes the functions of the OS, and driver software for input and output devices. These software units are loaded onto the RAM 12 together with various pieces of data and are executed by the CPU 11 and the entire PC 1 functions as functional modules illustrated in FIG. 7 and executes the process illustrated in FIG. 8.

Figure 7:
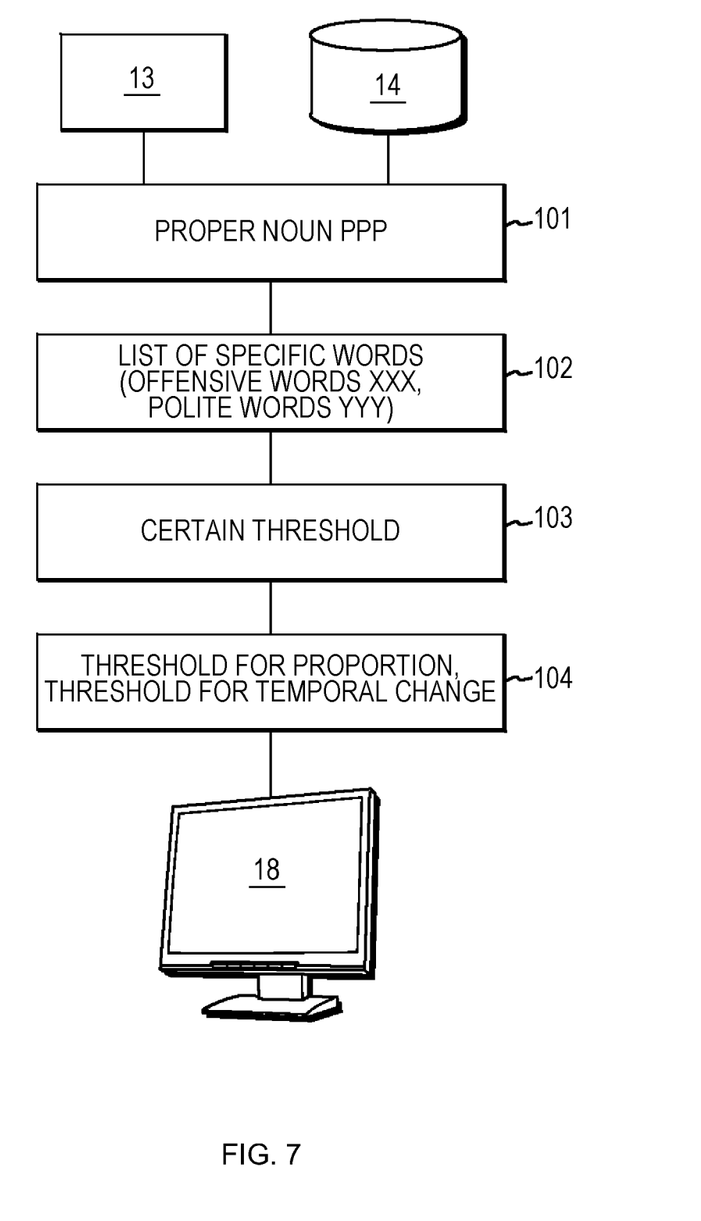
FIG. 7 is a block diagram describing the functional modules of the personal computer.

FIG. 7 is a functional block diagram describing the functional modules of the PC 1 according to an embodiment of the present invention. The PC 1 functions as an input module 101, a determination module 102, a calculation module 103, and an output module 104.

Figure 8:
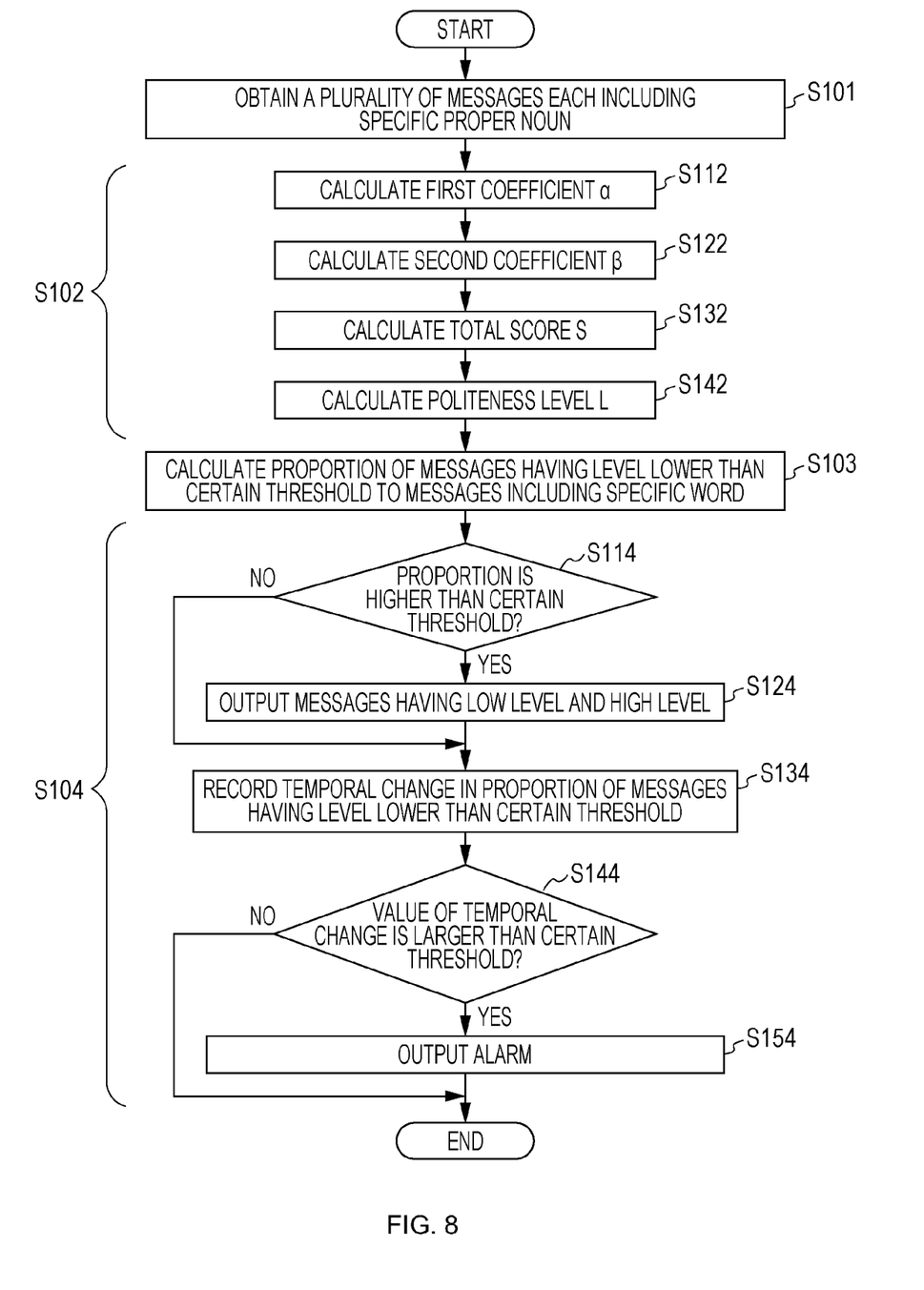
FIG. 8 is a flowchart describing a process executed by the personal computer.

FIG. 8 is a flowchart describing the process executed by the PC 1. First, in step S101, the input module 101 obtains a plurality of messages m(1) to m(n), each including a specific proper noun (here, represented by PPP). Specifically, a condition is sent from the PC 1 to the microblog server 2. The condition is that a message includes a proper noun PPP and a period in which the message was sent is within a specified period. Subsequently, the PC 1 receives data of a group of messages that satisfy the condition from the microblog server 2. At this time, the PC 1 receives data of a group of messages that satisfy the condition [see FIG. 4(a)], data about the users associated with the messages [see FIG. 4(b)], and profiles of the users associated with the messages [see FIG. 4(c)]. These pieces of received data are stored in the HDD 14 of the PC 1. Also, the above-described period can include the future and messages can be sequentially sent from the microblog server 2 to the PC 1 until the end of the period comes. Furthermore, when the amount of data of a group of messages [see FIG. 4(a)], data about the users associated with the messages [see FIG. 4(b)], and profiles of the users associated with the messages [see FIG. 4(c)] stored in advance in the HDD 14 of the PC 1 is large, a group of messages that satisfy the above-described condition can be searched for among these pieces of data.

Figure 9:
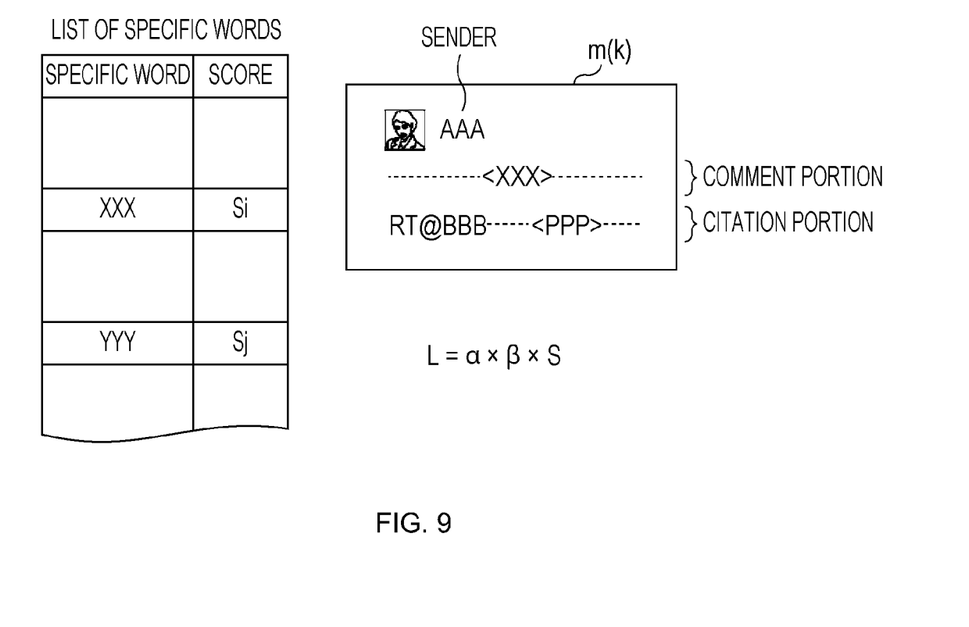
FIG. 9 is a conceptual diagram describing calculation of a politeness level.

Subsequently, the determination module 102 calculates a politeness level L of each message in step S102. FIG. 9 is a conceptual diagram describing calculation of the politeness level L. The determination module 102 stores a list of specific words in advance. The list of specific words includes a plurality of offensive words (represented by XXX) and a plurality of polite words (represented by YYY) and each specific word has a corresponding score S. Here, examples of the offensive words XXX include ancillary words including "yagaru" and "chimau" (auxiliary verb for expressing something in an impolite manner in Japanese language) and their conjugational forms and independent words including "yatsura" and "omae" ("yatsura" is a way of saying "they" and "omae" is a way of saying "you" in an impolite manner in Japanese language). Examples of the polite words YYY include ancillary words including "desu" and "masu" (auxiliary verb for expressing something in a polite manner in Japanese language) and their conjugational forms and independent words including "oki" (a polite expression placed at the start of a sentence in Japanese language). Each score can be set in the following manner, for example, the score for an offensive word XXX is uniformly set to be "minus one" and the score for a polite word YYY is uniformly set to be "plus one." Alternatively, different values can be set in accordance with the degree of offensiveness or politeness. Alternatively, only offensive words XXX can be targets (the score for a polite word YYY is set to be "zero") or only polite words YYY can be targets (the score for an offensive word XXX is set to be "zero").

Calculation of the politeness level L of each message in step S102 is performed in the following manner. First, the determination module 102 calculates a first coefficient $\alpha$ in step S112, calculates a second coefficient $\beta$ in step S122, calculates a total score S in step S132, and calculates the politeness level L on the basis of the first coefficient $\alpha$, the second coefficient $\beta$, and the total score S in step S142.

The first coefficient $\alpha$ can be set to have a value of one or more when the message m(k) as a target of calculation cites another message [see FIG. 5(c) to FIG. 5(e)] and to have a value of one when the message m as a target of calculation does not cite another message. The first coefficient $\alpha$ can be set to have a larger value when the message m as a target of calculation cites another message and when the proportion of the number of characters n in a comment portion is relatively large with respect to the number of characters M of the entire message (=the number of characters in a comment portion+ the number of characters in a citation portion). For example, the first coefficient $\alpha$ can be calculated using an expression: first coefficient $\alpha=1+$(the number of characters n in a comment portion/the number of characters M in the entire message). For example, it is assumed that the specific proper noun PPP is "Z corporation" and the offensive words XXX are "hidoi (terrible)," "shinjirarenai (unbelievable)," and "maji (really)." In this case, the first coefficient $\alpha$ of the message "kore maji hidosugiru, shinjirarenai RTZ corporation de yarase hakkaku (this is really too terrible and unbelievable, faking has been discovered in RTZ corporation)" (example 2) has a larger value than the first coefficient $\alpha$ of the message "kore hidosugiru RTZ corporation de yarase hakkaku (this is too terrible, faking has been discovered in RTZ corporation)" (example 1). That is, $1<\alpha$ (example 1)$<\alpha$ (example 2).

The second coefficient $\beta$ is determined in accordance with the difference between the politeness level of a typical message of a user who has sent the message m as a target of calculation (here, user AAA) and the politeness level of the message m(k) as a target of calculation. That is, the second coefficient $\beta$ can be set to have a larger value (larger than one) when a user who usually sends a message of a high politeness level exceptionally sends a message of a low politeness level. Specifically, for example, when "P=(the number of messages having a politeness level higher than a threshold $\theta 1$ of user AAA)/(the number of messages of user AAA)" is larger than a threshold $\theta 2$, the second coefficient $\beta$ can be set to be $1+(P-\theta 2)*Wp$. Otherwise the second coefficient $\beta$ can be set to be 1. Here, Wp is a weight which is determined based on how much importance is put on an exceptional message.

The total score S is a sum of scores corresponding to specific words (offensive words XXX and polite words YYY) included in a comment portion of the message m(k) as a target of calculation. When only one offensive word XXX is included in the comment portion of the message m(k) as a target of calculation, the score si thereof is the total score S. On the other hand, when a plurality of offensive words XXX are included or when both an offensive word XXX and a polite word YYY are included, the sum of scores corresponding thereto can be regarded as the total score S. When a plurality of offensive words XXX are included and when scores s of different values are associated therewith, the average of the values can be regarded as the total score S or the sum of the top plural values having a large absolute value of the score can be regarded as the total score S. The politeness level L can be calculated as the product of the first coefficient $\alpha$, the second coefficient $\beta$, and the total score S.

Subsequently, in step S103, the calculation module 103 calculates the proportion of messages having a politeness level L lower than a certain threshold (for example, −1) with respect to the plurality of messages m(1) to m(n). Subsequently, in step S104, the output module 104, which has a threshold for proportion and a threshold for temporal change, outputs various displays on the display 18 on the basis of the result.

Figure 10:
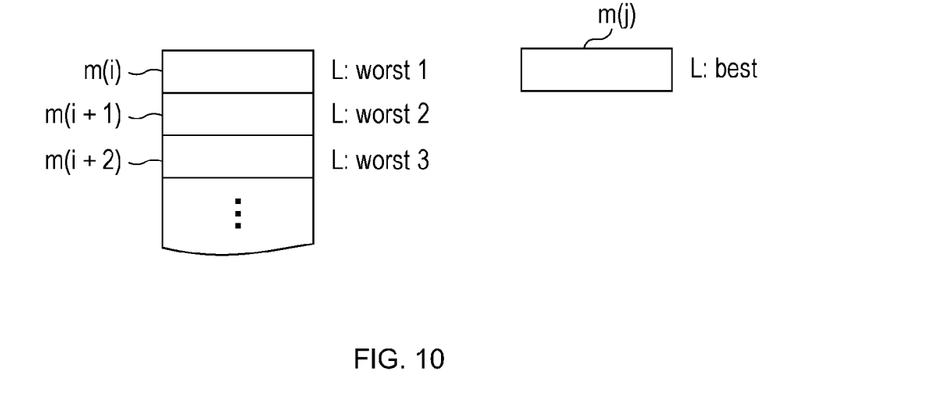
FIG. 10 is a diagram illustrating an example of an output screen.

First, in step S114, the output module 104 determines whether or not the proportion of messages having a politeness level L lower than a certain threshold (for example, −1) with respect to the plurality of messages m(1) to m(n) is higher than the threshold for proportion. When the proportion is higher than the threshold, that is, when the proportion of offensive messages increases, the output module 104 displays messages having a low politeness level L (offensive messages) and messages having a high politeness level L on the display 18 in step S124 (see FIG. 10). Here, a plurality of three offensive messages m(i) to m(i+2) are selected in ascending order of the politeness level L. Also, a message m(j) having a high politeness level L is displayed, which helps objective grasping of a cause of negative opinions. Of course, a plurality of messages having a high politeness level L can be displayed. In the messages which are displayed, specific words (offensive words XXX and polite words YYY) and proper nouns PPP can be displayed in different formats so that they are easily distinguished from one another (for example, highlighted with different colors).

Figure 11:
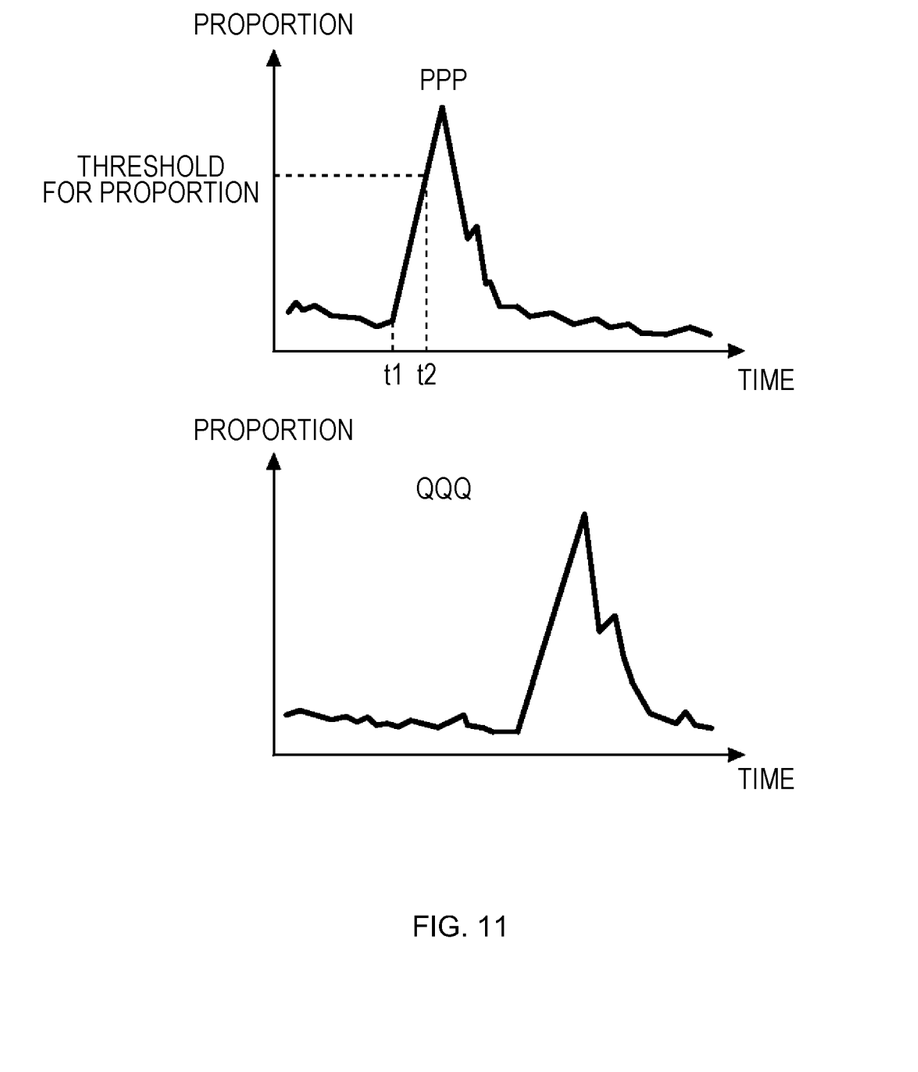
FIG. 11 is a diagram illustrating another example of the output screen.

Furthermore, the output module 104 records temporal change in the proportion of messages having a politeness level L lower than the certain threshold (for example, −1) at certain time intervals (for example, every hour) in step S134 and determines whether the value of temporal change is larger than a threshold for temporal change in step S144. If the value of temporal change is larger than the threshold, that is, if the proportion of offensive messages suddenly increases, the output module 104 is capable of displaying an alarm (not illustrated) on the display 18 (step S154). Also, as illustrated in FIG. 11, the output module 104 is capable of displaying a graph showing temporal change in the proportion of messages having a politeness level L lower than the certain threshold. In the upper graph, an alarm is output at time t1 (at an early stage) and at time t2 when the proportion reaches the threshold, messages having a low politeness level L (offensive messages) and messages having a high politeness level L are displayed (see FIG. 10). Furthermore, not only messages including the specific proper noun PPP, but also messages including another specific proper noun QQQ can be monitored (see the lower graph in FIG. 11). Accordingly, for example, negative opinions regarding a plurality of companies can be monitored or negative opinions regarding a certain company and the products of the company can be monitored.

The present invention can take the form of an embodiment in which the entire configuration is constituted by hardware, the entire configuration is constituted by software, or an embodiment in which the configuration includes both hardware and software elements. According to a preferred embodiment, the present invention is applied to software (for example, firmware, resident software, microcode, or syntactic analysis picocode).

Furthermore, the present invention can take the form of a computer program product including program code which is used by a computer or a certain command execution system or which is used in association therewith, or a computer-readable medium. For description purposes, a computer-readable medium can be a certain device capable of accommodating, storing, communicating, propagating, or transmitting a program which is used by a certain command execution system, apparatus, or device or which used in association therewith. Specifically, the above-described syntactic analysis control module constitutes a command execution system or "computer" in this meaning.

A medium can be an electronic, magnetic, optical, electromagnetic, infrared, or semiconductor system (or apparatus or device) or can be a propagation medium. Examples of the computer-readable medium include a semiconductor or solid-state memory, a magnetic tape, a removable computer diskette, a random access memory (RAM), a read only memory (ROM), a rigid magnetic disk, and an optical disk. At present, examples of the optical disk include a compact disk read only memory (CD-ROM), a compact disk read/write (CD-R/W) memory, and a digital versatile disk (DVD).

A data processing system suitable for storing, executing, or storing and executing program code can include at least one processor connected to a memory element directly or indirectly via a system bus. The memory element can include a local memory used in actual execution of program code, a bulk storage device, and a cache memory that provides temporary storage to at least part of the program code in order to reduce the number of times of reading from the bulk storage device during execution.

We claim:

1. A computer implemented method for processing a plurality of messages sent by a plurality of users over time, wherein the computer includes a processor communicatively coupled to a memory, the method comprising the steps of:
   obtaining the plurality of messages each including a specific proper noun;
   determining a politeness level of each of the plurality of messages each including the specific proper noun; and
   calculating a proportion of messages having a politeness level lower than a certain threshold with respect to the plurality of messages each including the specific proper noun,
   wherein the message includes a citation portion cited from another message sent by another user and a comment portion including a comment given regarding the citation portion by a user as a sender of the message and the step of determining a politeness level determines the politeness level on the basis of both the comment portion and the citation portion, the comment portion have a different effect than the citation portion on the determined politeness level, and
   wherein the determined politeness level is a function of a value of alpha corresponding to one plus a ratio of number of characters in the comment portion divided by number of characters in the entire message including the comment portion and the citation portion.

2. The method according to claim 1, wherein the specific proper noun is any name of a specific organization, specific product, specific service, and/or specific person.

3. The method according to claim 1, wherein the step of determining a politeness level determines the politeness level on the basis of whether or not the message includes a specific word representative of a politeness level.

4. The method according to claim 3, wherein the specific word representative of a politeness level is an ancillary word including "yagaru" or "chimau" or a conjugational form of the ancillary word and the step of determining a politeness level determines that the politeness level is low when the message includes the specific word.

5. The method according to claim 3, wherein the specific word representative of a politeness level is an independent word including "oki" and the step of determining a politeness level determines that the politeness level is high when the message includes the specific word.

6. The method according to claim 1, wherein, when the number of characters in the comment portion is large compared to when the number of characters in the comment portion is small, the step of determining a politeness level determines that the politeness level is higher when determining the politeness level to be high and determines that the politeness level is lower when determining the politeness level to be low.

7. The method according to claim 1, wherein the step of determining a politeness level determines the politeness level in view of a trend of politeness of messages of the individual users.

8. The method according to claim 1, wherein the step of determining a politeness level determines a politeness level of one message on the basis of politeness levels of other messages sent by a user who has sent the one message.

9. The method according to claim 8, wherein the step of determining a politeness level determines the politeness level of the one message on the basis of a difference between the politeness level of the one message and the politeness levels of the other messages.

10. The method according to claim 1, further comprising the steps of:
   recording temporal change in the proportion of the messages having a politeness level lower than the certain threshold; and
   outputting a certain alarm when a value of the temporal change exceeds a certain threshold.

11. The method according to claim 1, wherein, when the proportion exceeds a certain threshold, messages having a politeness level lower than a certain lower-limit threshold are output.

12. The method according to claim 11, wherein the output messages are selected in ascending order of the politeness level.

13. The method according to claim 11, wherein the step of determining a politeness level determines whether the output messages include a specific word representative of a politeness level and highlights the specific word in the output messages.

14. The method according to claim 11, wherein, when the proportion exceeds the certain threshold, messages having a politeness level higher than a certain upper-limit threshold are output.

15. The method according to claim 1, wherein the step of obtaining receives and obtains, from a social media server, a plurality of messages sampled under a condition of including the specific proper noun, among messages sent to the social media server in a certain period.

16. The method according to claim 1 wherein the determined politeness level is a function of a ratio of the number of characters in the comment portion over the number of characters in the entire message including the comment portion and the citation portion.

17. The method according to claim 1 wherein the value of alpha corresponds to one in the absence of the citation portion.

18. A non-transitory computer readable storage medium tangibly embodying a computer readable non-transitory program code having computer readable instructions which, when implemented, cause a computer to carry out the steps of a method for processing a plurality of messages sent by a plurality of users over time, the method comprising the steps of:
   obtaining the plurality of messages each including a specific proper noun;
   determining a politeness level of each of the plurality of messages each including the specific proper noun; and
   calculating a proportion of messages having a politeness level lower than a certain threshold with respect to the plurality of messages each including the specific proper noun,
   wherein a first message of the plurality of messages includes a citation portion cited from another message sent by another user and a comment portion having a comment given regarding the citation portion by a user as a sender of the message, the first message determined to have a greater politeness level magnitude than a second message of the plurality of message including only a comment portion having a comment similar to the comment portion of the first message, and
   wherein the determined politeness level is a function of a value of alpha corresponding to one plus a ratio of number of characters in the comment portion divided by number of characters in the entire message including the comment portion and the citation portion.

19. The non-transitory computer readable storage medium according to claim 18 wherein the value of alpha corresponds to one in absence of the citation portion.

20. A computer for processing a plurality of messages sent by a plurality of users over time, comprising:
   means for obtaining the plurality of messages each including a specific proper noun;
   means for determining a politeness level of each of the plurality of messages each including the specific proper noun; and
   means for calculating a proportion of messages having a politeness level lower than a certain threshold with respect to the plurality of messages each including the specific proper noun,
   wherein a first message of the plurality of messages includes a citation portion cited from another message sent by another user and a comment portion having a comment given regarding the citation portion by a user as a sender of the message, the first message determined to have a greater politeness level magnitude than a second message of the plurality of message including only a comment portion having a comment similar to the comment portion of the first message, and
   wherein the determined politeness level is a function of a value of alpha corresponding to one plus a ratio of number of characters in the comment portion divided by number of characters in the entire message including the comment portion and the citation portion.

21. The computer according to claim 20 wherein the value of alpha corresponds to one in absence of the citation portion.

* * * * *